US008643718B2

United States Patent
Yamagata et al.

(10) Patent No.: US 8,643,718 B2
(45) Date of Patent: Feb. 4, 2014

(54) IMAGE MEASURING APPARATUS (75) Inventors: Masaoki Yamagata, Kawasaki (JP); Kentaro Nemoto, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 288 days.

(21) Appl. No.: 13/277,493

(22) Filed: Oct. 20, 2011

(65) Prior Publication Data

US 2012/0098963 A1 Apr. 26, 2012

(30) Foreign Application Priority Data

Oct. 22, 2010 (JP) .................................. 2010-237057

(51) Int. Cl.
*H04N 7/18* (2006.01)

(52) U.S. Cl.
USPC ........................................ 348/135; 348/297

(58) Field of Classification Search
USPC .................................. 348/135, 297
See application file for complete search history.

(56) References Cited

FOREIGN PATENT DOCUMENTS

| JP | 2009-534969 | 9/2009 |
|---|---|---|
| WO | 2007/125081 | 11/2007 |
| WO | WO 2007125081 A1 * | 11/2007 |

* cited by examiner

*Primary Examiner* — Sath V Perungavoor
*Assistant Examiner* — Jeffery Williams
(74) *Attorney, Agent, or Firm* — Rankin, Hill & Clark LLP (57) ABSTRACT An image measuring apparatus includes: a light source; an imaging device; and a controller configured to adjust a light emission amount of the light source based on a light reception amount of the imaging device, wherein: when a light reception amount of the light receiving element is more than a maximum value, the controller reduces a light amount of the light source in next light reception; when the light reception amount of the light receiving element is less than the maximum value, the controller increases the light amount of the light source in the next light reception; and when the light amount of the light source reaches the maximum light amount and the light reception amount is smaller than a minimum value, the controller makes the light amount of the light source in the next light reception a minimum light amount.

5 Claims, 8 Drawing Sheets

LASER OUTPUT

TIME

FIG. 10

LASER OUTPUT

TIME

FIG. 11

IMAGE MEASURING APPARATUS

CROSS-REFERENCE TO RELATED APPLICATION(S)

This application is based upon and claims the benefit of priority from Japanese Patent Application No. 2010-237057, filed on Oct. 22, 2010, the entire contents of which are incorporated herein by reference.

BACKGROUND

1. Field of the Invention

The present invention relates to an image measuring apparatus that measures the shape of an object to be measured, by emitting light to the object to be measured and imaging the object to be measured.

2. Description of the Related Art

Conventionally, a shape measuring apparatus has been known that measures the surface shape of an object to be measured by scanning the surface of the object to be measured by a probe and acquiring the positional coordinates and the like of each part of the object to be measured. As such a shape measuring apparatus, a noncontact type is known that performs measurement without bringing a probe into contact with the surface of an object to be measured by means of an optical system as in JP-T-2009-534969.

In the noncontact-type surface shape measuring apparatus described in JP-T-2009-534969, linear laser is emitted to the object surface by a scanning probe and this is imaged from a predetermined angle with respect to the laser emission direction to thereby measure the surface shape of the object. With this noncontact-type surface shape measuring apparatus, there is no possibility that the object surface is flawed, and it is unnecessary to consider the influence of the probe wear on the measurement accuracy.

In such a noncontact-type surface shape measuring apparatus, when the object surface is imaged in a case where the reflectance of the object surface, the relative angle between the optical probe and the object surface, and the like are finely changed, an insufficiency of light amount and an excess of light amount occur. That is, in low-reflectance parts, the emitted laser light is hardly reflected and this makes the observation by light receiving elements difficult, and in high-reflectance parts, saturation (excess of light amount) occurs.

To solve this problem, the invention described in JP-T-2009-534969 takes the following measure: When the object surface is imaged, one-dimensional images in a direction perpendicular to linear laser light are successively taken along the laser light, and at the same time, the output of the laser device is adjusted according to the maximum brightness in the one-dimensional images. This method enables the laser-irradiated object surface to be imaged with an appropriately light amount.

However, with this method, since no reflected light is detected when parts not reflecting laser light (e.g. a part where no object to be measured is present in the measurement range and a part hidden by bumps and dips) are imaged, the laser device always operates at maximum output. In such a case, there is a possibility that a thermal drift or a malfunction occurs due to the heat generation of the laser, and even if a cooling fan is attached, the vibration by the cooling fan is transmitted to the probe and this can degrade the measurement accuracy.

Moreover, in such a case, it is necessary to provide the measurement probe with an air hole for cooling, and this leads to deterioration of the environment resistance. Further, the laser light source deteriorates faster, and power consumption is high.

SUMMARY

The present invention is made in view of such a point, and an object thereof is to suppress heat generation, reduce power consumption and extend the life of the light source.

According to an aspect of the invention, there is provided an image measuring apparatus including: a light source configured to emit linear light to an object to be measured; an imaging device configured to image the object; and a controller configured to adjust alight emission amount of the light source based on a light reception amount of the imaging device, wherein: the imaging device has a light receiving element arranged therein, and successively receives an image of the object in a direction of a row or in a direction of a column; when a light reception amount of the light receiving element is more than a maximum value, the controller reduces a light amount of the light source in next light reception; when the light reception amount of the light receiving element is less than the maximum value, the controller increases the light amount of the light source in the next light reception; and when the light amount of the light source reaches the maximum light amount and the light reception amount is smaller than a minimum value, the controller makes the light amount of the light source in the next light reception a minimum light amount.

According to the above configuration, since the output of the light source can be reduced when a portion of the measurement field, where the light reception amount is low, is measured, the heat generation suppression, power consumption reduction and light source life extension are achieved.

When the light amount of the light source is made the minimum light amount, the controller may control the light amount of the light source to the maximum light amount or a light amount between the maximum light amount and the minimum light amount in the next or n-th light reception (n is an integer that is more than one). According to this configuration, the presence of the object can be determined at intervals, and the normal measurement can be conducted when the object is determined.

The imaging device may receive reflected light from the object in a direction at a predetermined angle with respect to a direction of light emission from the light source to the object.

The imaging device may have a CMOS element having a rolling shutter function of successively causing a light receiving element column arranged in a direction substantially orthogonal to the linear light from the light source to perform light reception scanning in a direction orthogonal to the light receiving element column.

According to another aspect of the invention, there is provided an image measuring apparatus including: a light source that emits linear light to an object to be measured; an imaging device configured to image the object; and a controller configured to adjust a light emission amount of the light source based on a light reception amount of the imaging device, wherein: the imaging device has a light receiving element arranged therein, and successively receives an image of the object in a direction of a row or in a direction of a column; when a light reception amount of the light receiving element is more than a maximum value, the controller reduces a light amount of the light source in next light reception; when the light reception amount of the light receiving element is less than the maximum value, the controller increases the light amount of the light source in the next light reception; and when the light amount of the light source reaches the maximum light amount and the light reception amount is smaller than a minimum value, the controller alternately sets the light amount of the light source to a minimum light amount and to a light amount larger than the minimum light amount every light reception in next and succeeding light receptions.

According to the present invention, heat generation suppression, power consumption reduction and light source life extension are achieved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Next, an image measuring apparatus according to a first embodiment of the present invention will be described in detail with reference to the drawings.

Figure 1:
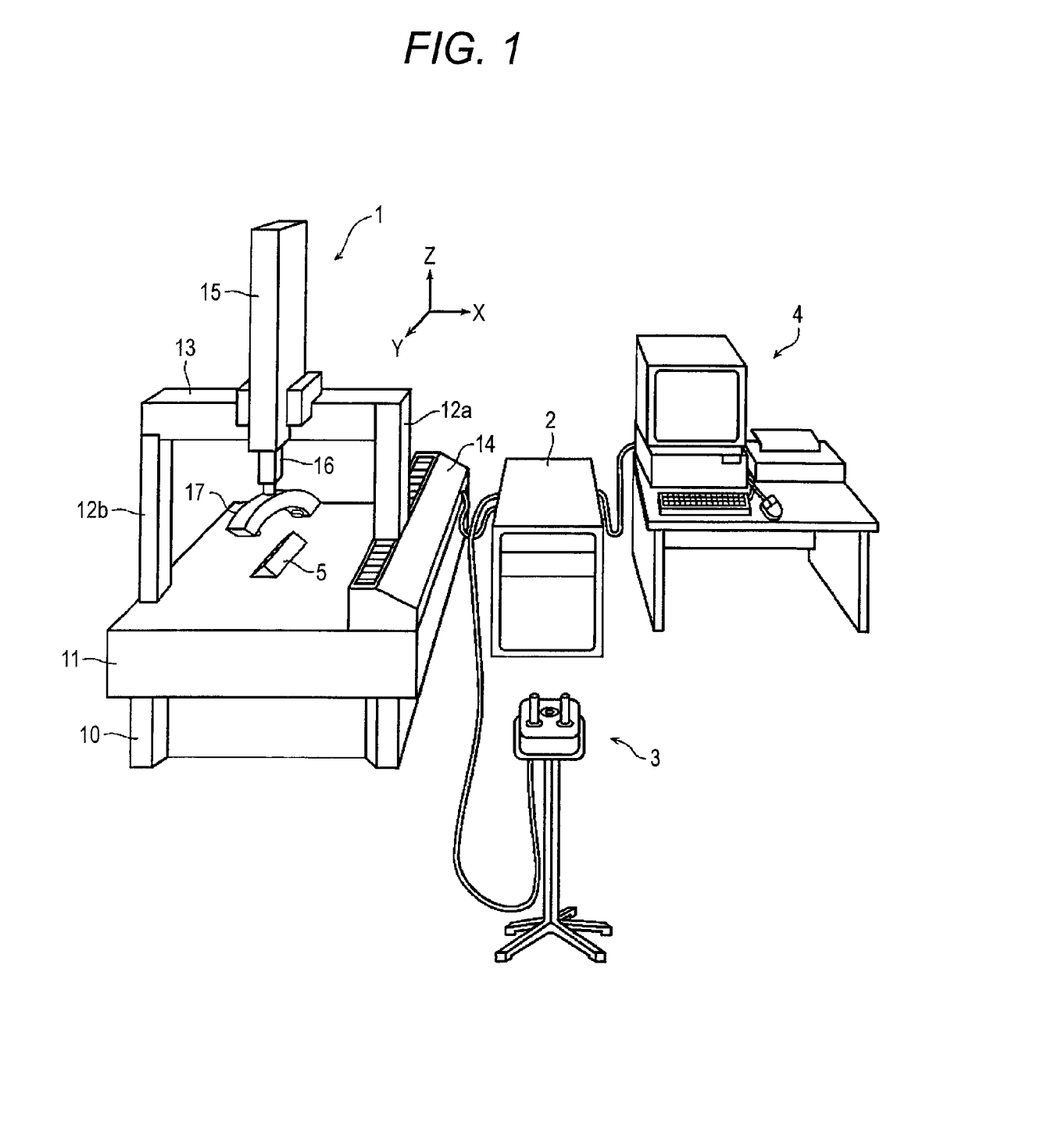
FIG. 1 is a general view of a system constituting an image measuring apparatus according to a first embodiment of the present invention.

FIG. 1 is a general view of a system constituting the image measuring apparatus according to the present embodiment.

This image measuring apparatus is structured by loading an optical probe 17 according to the present embodiment as the measurement probe of a three-dimensional measuring device 1. This image measuring apparatus includes: a driving controller for controlling the driving of the three-dimensional measuring device 1 and acquiring necessary measured coordinate values from the three-dimensional measuring device 1; an operation panel 3 for manually operating the three-dimensional measuring device 1 through the driving controller 2; and a host system 4 having the functions of editing and executing a part program that provides an instruction as to the procedure of the measurement at the driving controller 2, performing a calculation for applying a geometric shape to the measured coordinate values acquired through the driving controller 2, and recording and transmitting the part program.

The three-dimensional measuring device 1 is structured as follows: On a vibration isolation platform 10, a surface plate 11 is placed so as to coincide with a horizontal plane with the upper surface thereof as the base surface, and an x-axis guide 13 is supported by the upper ends of arm supporters 12a and 12b provided upright on both ends of the surface plate 11. The arm supporter 12a has the lower end thereof driven in a y-axis direction by a y-axis driving mechanism 14, and the arm supporter 12b has the lower end thereof supported so as to be movable in the y-axis direction on the surface plate 11 by an air bearing. The x-axis guide 13 drives a vertically extending z-axis guide 15 in an x-axis direction. On the z-axis guide 15, a z-axis arm 16 is provided so as to be driven along the z-axis guide 15, and the noncontact-type optical probe 17 is attached to the lower end of the z-axis arm 16. The optical probe 17 may be rotatable within the horizontal plane or may be rotatable within a vertical plane.

Figure 2:
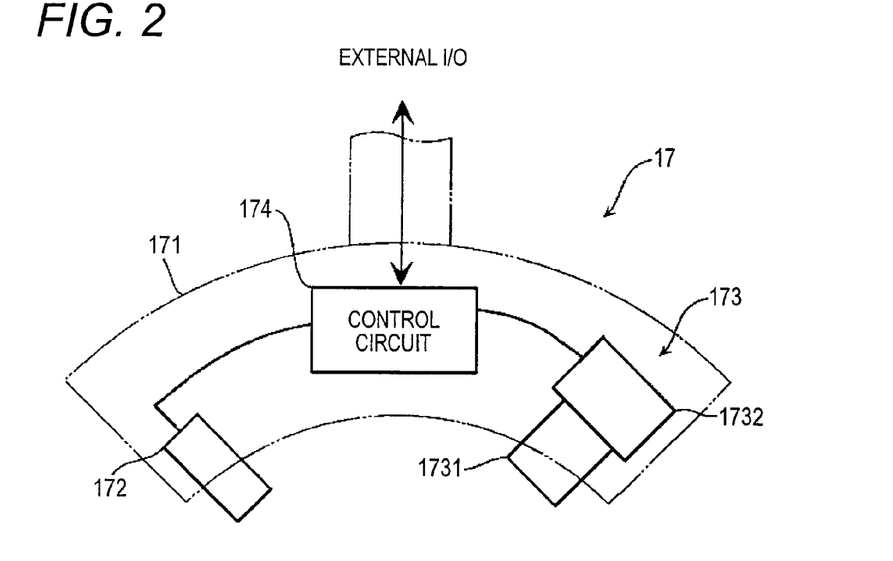
FIG. 2 is a view showing the structure of an optical probe in the apparatus.

FIG. 2 shows the structure of the optical probe 17 of the image measuring apparatus according to the present embodiment. The optical probe 17 is provided with: a housing 171; a laser light source 172 disposed within the housing 171; an imaging device 173 that images an object to be measured; and a control circuit 174 that adjusts the light emission amount of the light source based on the light reception amount of the imaging device 173.

The laser light source 172 emits, toward an object to be measured 5, linear laser light (laser sheet) extending in a direction that is straight with respect to a plane formed by the optical axis (optical axis in a central part in the scanning direction) of the later-described laser light source 172 and the optical axis of the imaging device 173, and linearly illuminates the surface of the object 5. While as such a laser sheet, one is desirable that is generated by a combination of the laser light source 172 and a cylindrical lens or the like, a different method may be used such as creating linear light by linearly arranging LEDs and combining an optical system such as a frosted lens therewith.

Figure 5A:
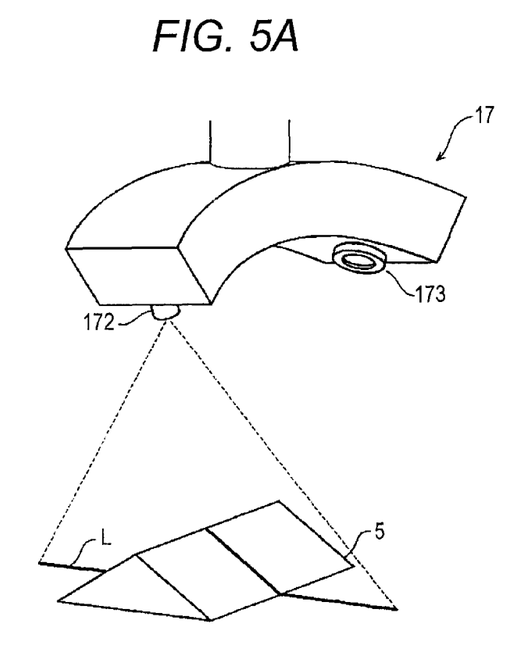
FIGS. 5A and 5B are schematic views for explaining the operation of the image measuring apparatus.
Figure 5B:
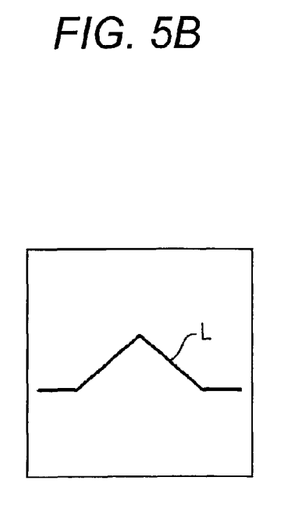

The imaging device 173 is provided with an optical system 1731 and a CMOS image sensor 1732 that takes an image of the object 5 through the optical system 1731, and is disposed in a direction where light is received from a direction at a predetermined angle with respect to the direction of the light emission from the light source to the object 5. That is, the laser light emitted to the surface of the object 5 and reflected along the shape of the surface of the object 5 is received from the predetermined angle by the imaging device 173. Thereby, as shown in FIGS. 5A and 5B, the laser light becomes deformed along the projections and depressions on the surface of the object 5, so that the surface shape of the object 5 can be imaged.

Figure 3:
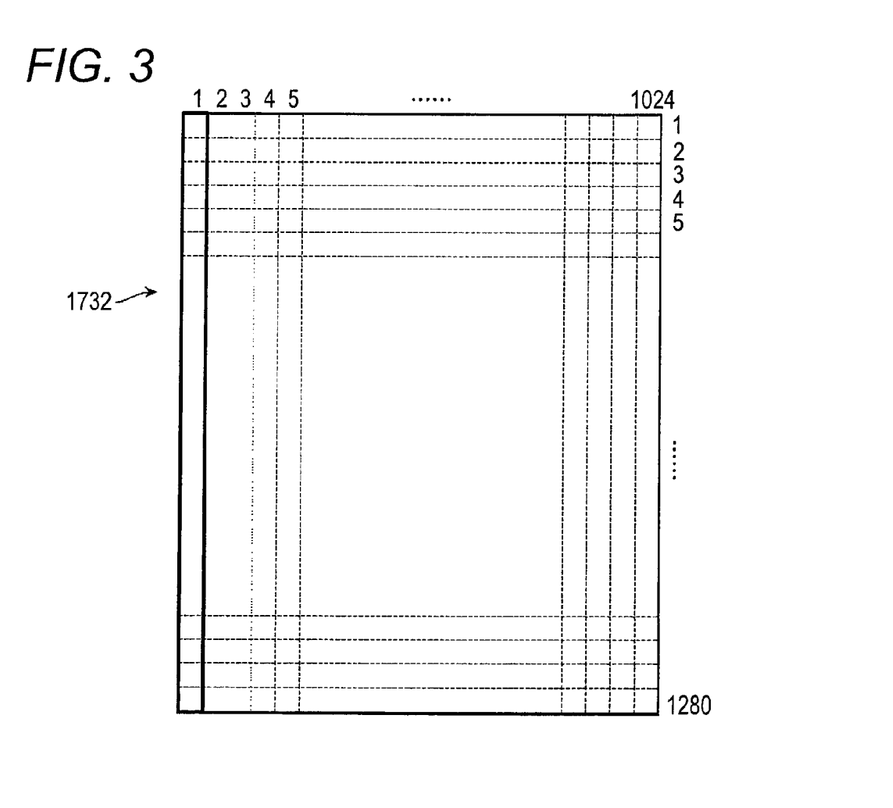
FIG. 3 is a schematic view showing a CMOS image sensor in the apparatus.

FIG. 3 is a schematic view showing the CMOS image sensor 1732 according to the present embodiment. The CMOS image sensor 1732 has a plurality of imaging elements arranged in a matrix form. In the present embodiment, the CMOS image sensor 1732 has 1024×1280 light receiving elements (CMOS cells), 1024 in a direction in which the linear laser light extends and 1280 in a direction orthogonal thereto. Moreover, the CMOS image sensor 1732 has a rolling shutter function. The rolling shutter function is a method in which only the light receiving elements arranged in one or more than one row (or column) are caused to simultaneously receive light and this row-wise (or column-wise) light reception is successively performed in the direction of the column (or in the direction of the row). For example, in FIG. 3, the light reception by the light receiving elements arranged in the first column (light receiving elements enhanced by the thick frame) is simultaneously performed. After this light reception is finished, light reception is successively performed in the second, third and succeeding columns.

Figure 4:
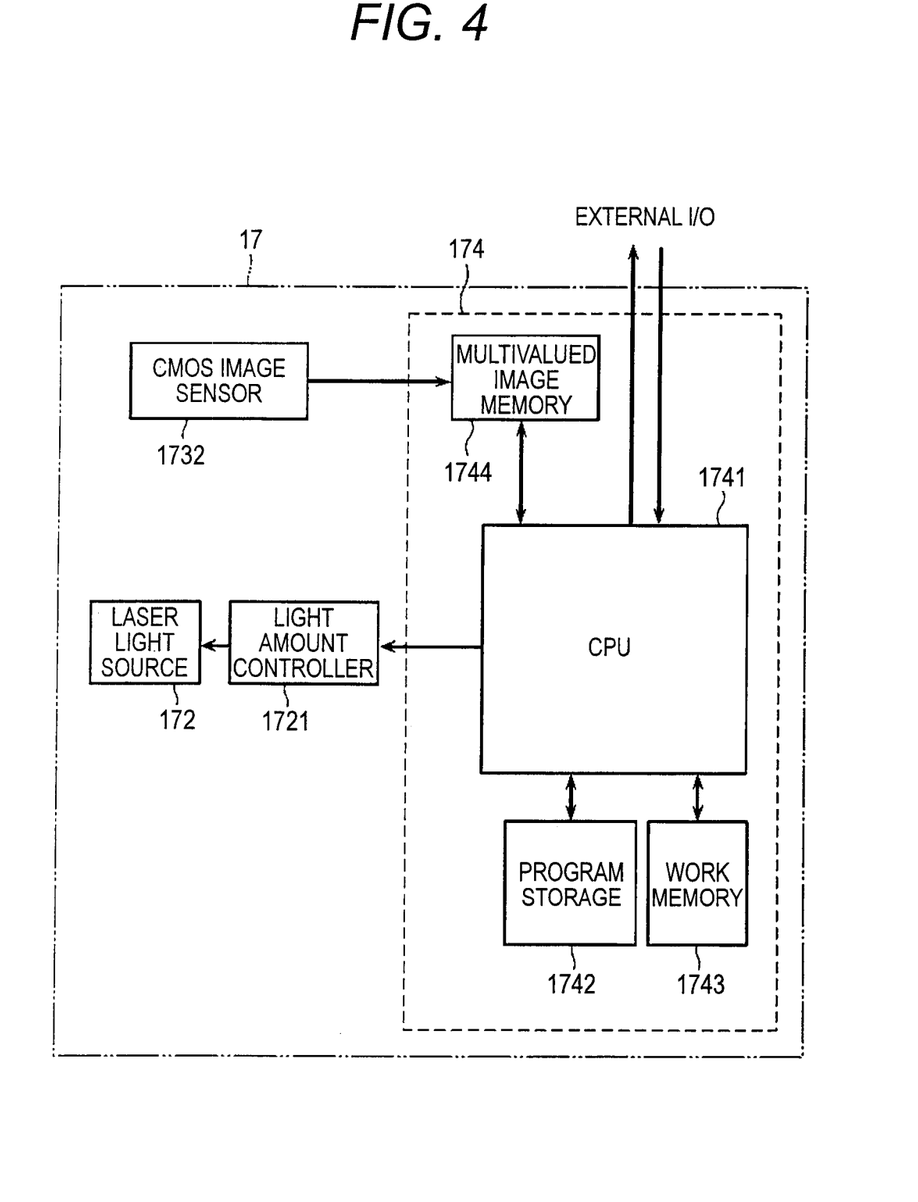
FIG. 4 is a block diagram showing a control system of the apparatus.

FIG. 4 is a block diagram showing a control system of the optical probe 17 according to the present embodiment. The control circuit 174 includes: a CPU 1741; a program storage 1742 connected to the CPU 1741; a work memory 1743; and a multivalued image memory 1744. The image information obtained by the CMOS image sensor 1732 is inputted to the CPU 1741 through the multivalued image memory 1744. The CPU 1741 adjusts the light amount of the laser light source 172 through a light amount controller 1721 according to the inputted image information.

Next, the operation of the thus structured image measuring apparatus will be described.

FIGS. 5A and 5B are schematic views for explaining the operation of the image measuring apparatus according to the present embodiment. When linear laser light is emitted to the object 5 by the laser light source 172, the reflected light L of the laser light becomes deformed along the surface of the object 5, and an outline of the object 5 that is cut at a certain plane is lit up. Since the imaging device 173 images the object 5 at a predetermined angle from the laser emission direction of the laser light source 172, as shown in FIG. 5B, an image of the reflected light L of the laser light along the surface shape of the object 5 can be taken.

Figure 6:
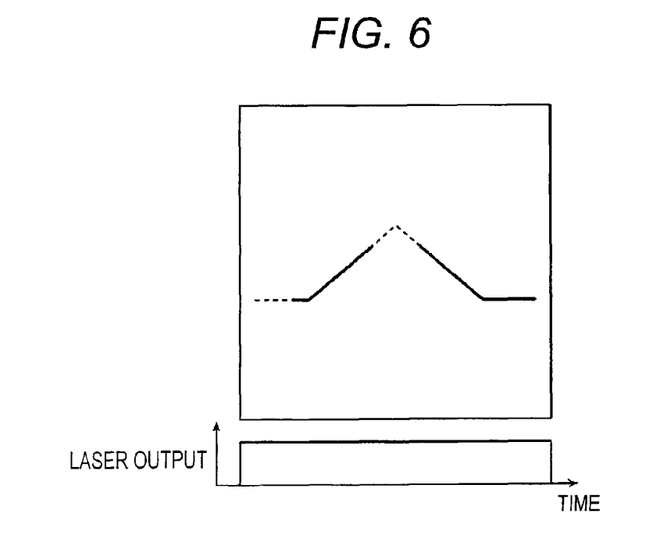
FIG. 6 is a view for explaining the operation of the image measuring apparatus in a first comparative example.

It is considered to image an object to be measured the reflectance of the surface of which differs according to position in the image measuring apparatus having the above-described structure. The upper view of FIG. 6 schematically shows an image when such an object to be measured 5 is measured. The solid line parts in the figure show that the amount of received light is within the measurement range of the CMOS image sensor 1732, and the dotted line parts in the figure show parts where the amount of received light is larger than the amount of light that can be received by the CMOS image sensor 1732 and saturation is occurring. In such parts where saturation is occurring, since it is difficult to accurately identify the position of the object to be measured, measurement accuracy is degraded. While the upper view of FIG. 6 is obtained by laterally scanning one-dimensional images in the longitudinal direction in the figure, the lower view of FIG. 6 shows a graph in which the vertical axis represents the laser output at this time, and the horizontal axis represents the time corresponding to one frame from the start of scanning to the end of scanning.

Figure 7:
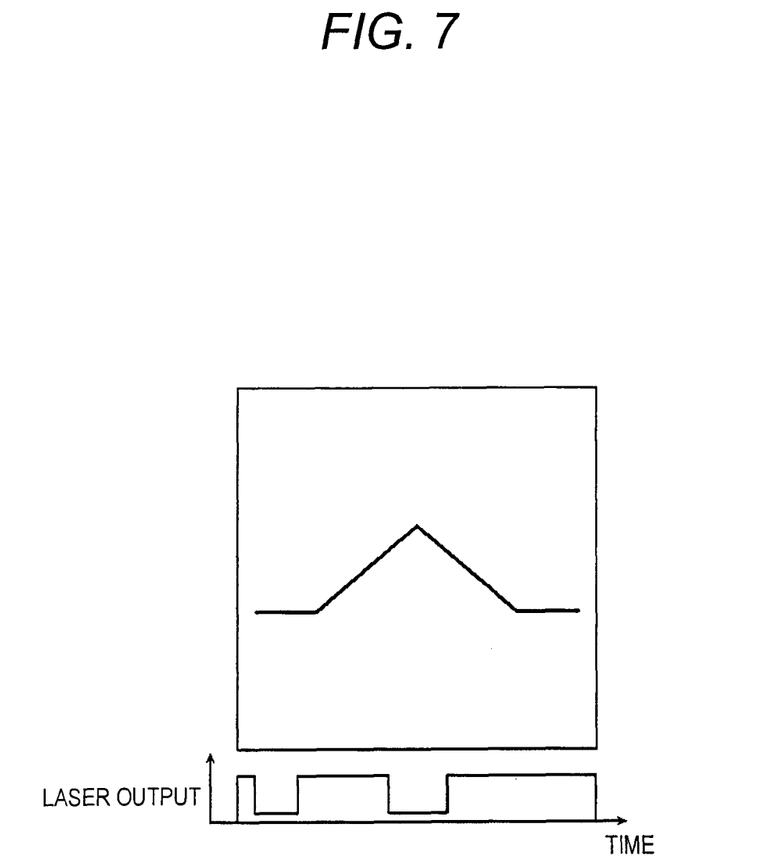
FIG. 7 is a view for explaining the operation of the image measuring apparatus in a second comparative example.

To solve the degradation in measurement accuracy due to saturation, it is considered to adjust the output of the laser light source 172 according to the reflectance of the surface of the object 5. A concrete method therefor will be described with reference to FIGS. 7 and 8. As in FIG. 6, in FIG. 7, the upper view shows an image taken by the CMOS image sensor 1732, and the lower view shows the relationship between the output of the laser light source 172 and the time from the start of scanning. As is also apparent from the lower view of FIG. 7, the output of the laser light source 172 is made low only when one-dimensional images of high-reflectance parts of the surface of the object 5 are taken. According to this method, an image of the surface of the object 5 can be taken without the occurrence of saturation as shown in the upper view.

Figure 8:
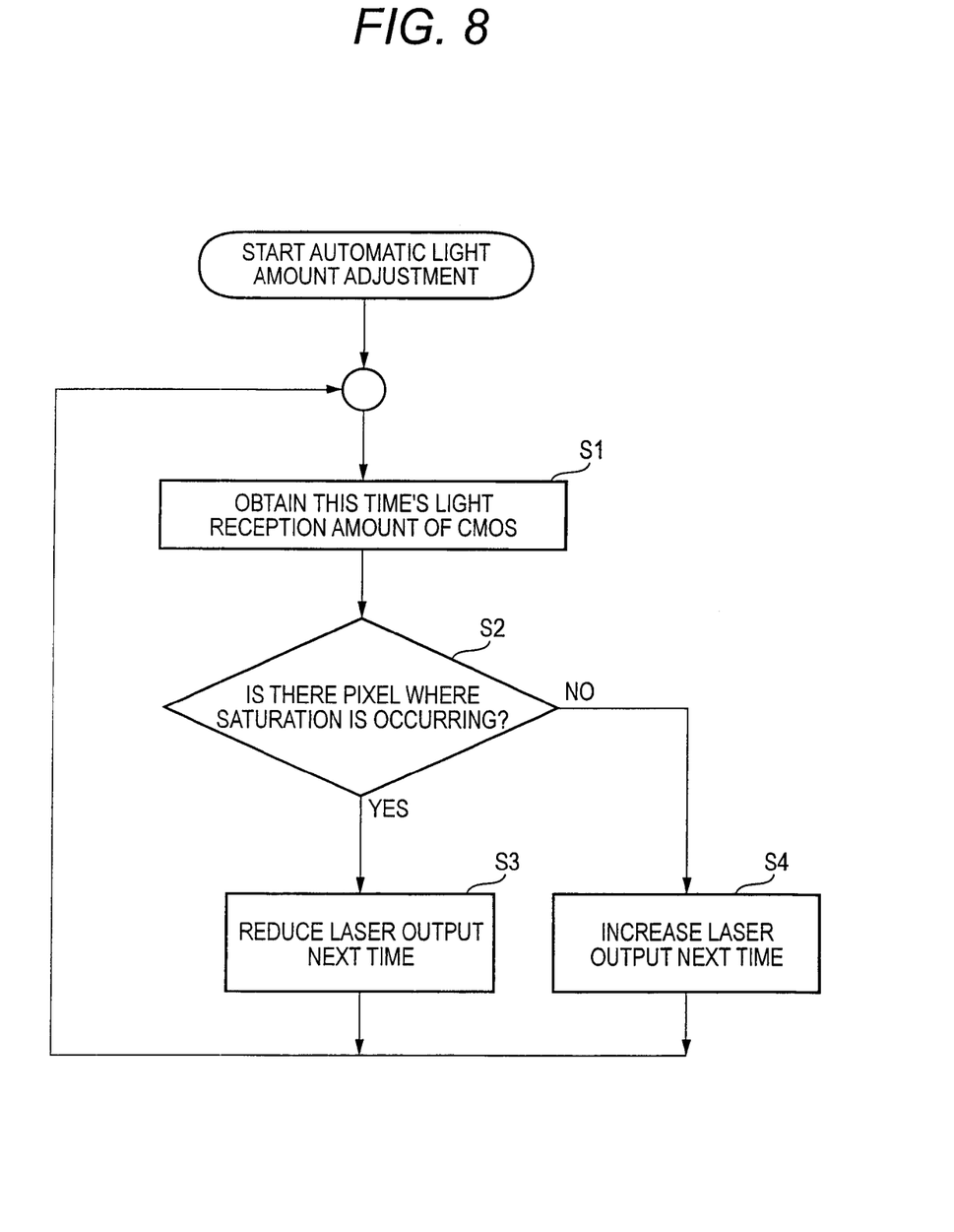
FIG. 8 is a flowchart showing a control method of a laser device in the second comparative example.

FIG. 8 shows a flowchart of adjusting the output of the laser light source 172 as described above. In this method, first, light reception by one column (or by one row) of the CMOS image sensor 1732 is performed to obtain one-dimensional image information (S1), and it is checked whether or not there is a pixel where saturation is occurring (S2). When there is a pixel where saturation is occurring, the output of the laser light source 172 is reduced (S3), and when there is no such pixel, the output of the laser light source is increased (S4). This operation is successively performed on each column of the CMOS image sensor 1732 shown in FIG. 3.

When the output of the laser light source 172 is adjusted by the above-described method, an image of the surface of the object 5 can be taken with a maximum light amount without the occurrence of saturation. However, with this method, the parts not reflecting the laser light (e.g. a part where no object to be measured is present in the measurement range and a part hidden by projections and depressions) are imaged, the laser light source 172 always operates at maximum output.

Figure 9:
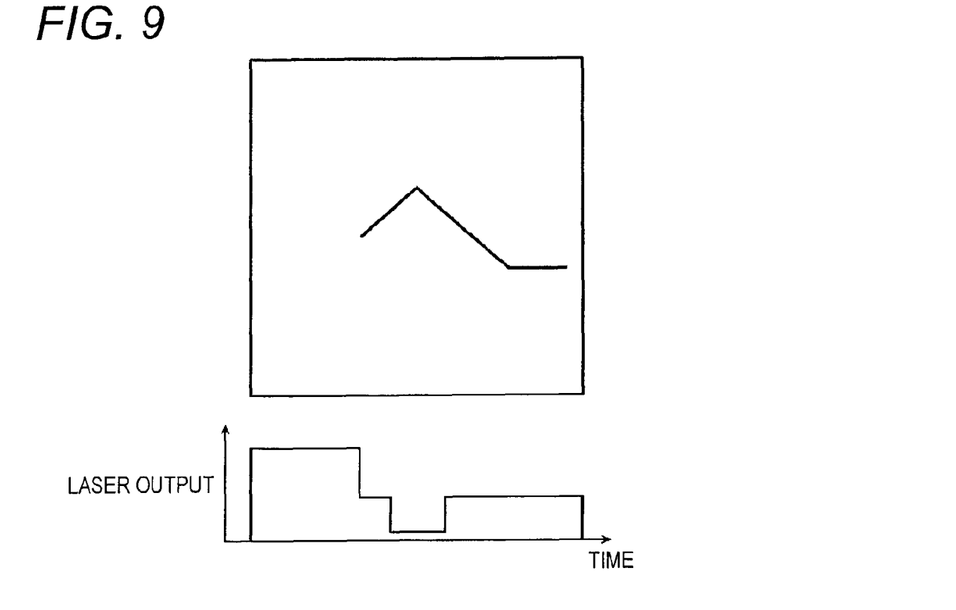
FIG. 9 is a view for explaining the operation of the image measuring apparatus in the second comparative example.

This situation will be described with reference to FIG. 9. As in FIGS. 6 and 7, in FIG. 9, the upper view shows an image taken by the CMOS image sensor 1732, and the lower view shows the relationship between the laser output and the time from the start of scanning. Moreover, in FIG. 9, it is assumed that an object part of the surface of which does not reflect laser light is observed. As described above, when no pixel where saturation is occurring can be detected by the CMOS image sensor 1732 even though laser light is emitted to the object surface, the output of the laser light source 172 is increased. Consequently, when the laser light is not reflected at the object surface, the output of the laser light source 172 continues increasing, so that when a part not reflecting the laser light is imaged, the laser light source 172 always operates at maximum output. In such a case, there is a possibility that a thermal drift or a malfunction occurs due to heat generation, and when a cooling fan is attached, the vibration is transmitted to the probe and this can degrade the measurement accuracy. Moreover, in such a case, it is necessary to provide the measurement probe with an air hole for cooling, and this leads to deterioration of the environment resistance. Further, the deterioration of the laser light source is promoted, and power consumption is high.

Figure 10:
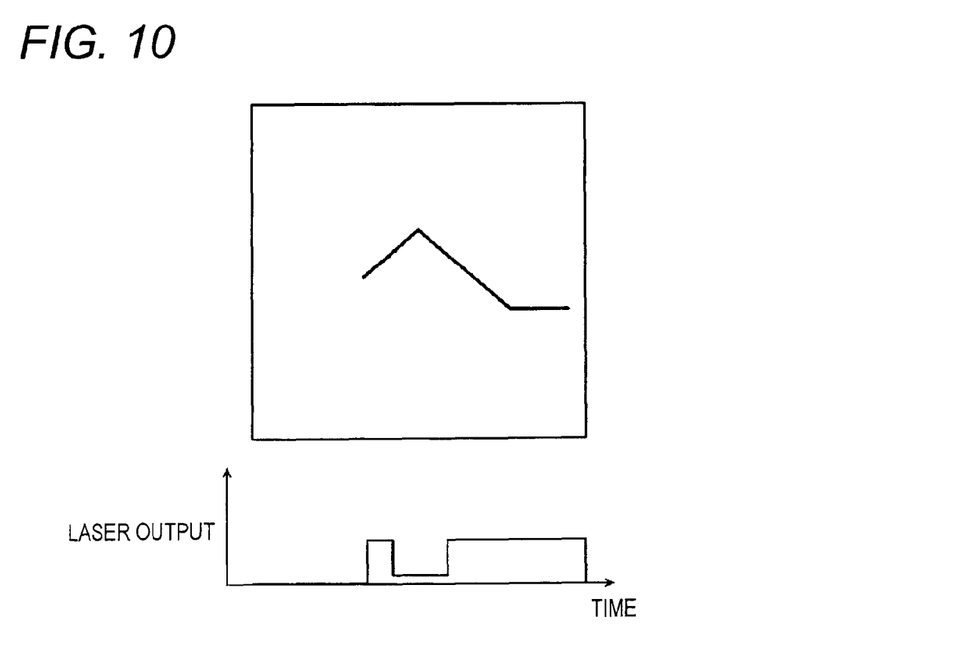
FIG. 10 is a view for explaining the operation of the image measuring apparatus according to the first embodiment of the present invention.

To solve this problem, in the present embodiment, for such a part of the object 5 that is not detected (hereinafter, referred to as non-detected part), the output of the laser light source 172 is made minimum. A concrete method therefor will be described with reference to FIGS. 10 and 11. In FIG. 10 which is basically the same as FIG. 9, the output of the laser light source for the non-detected part is a minimum value.

Figure 11:
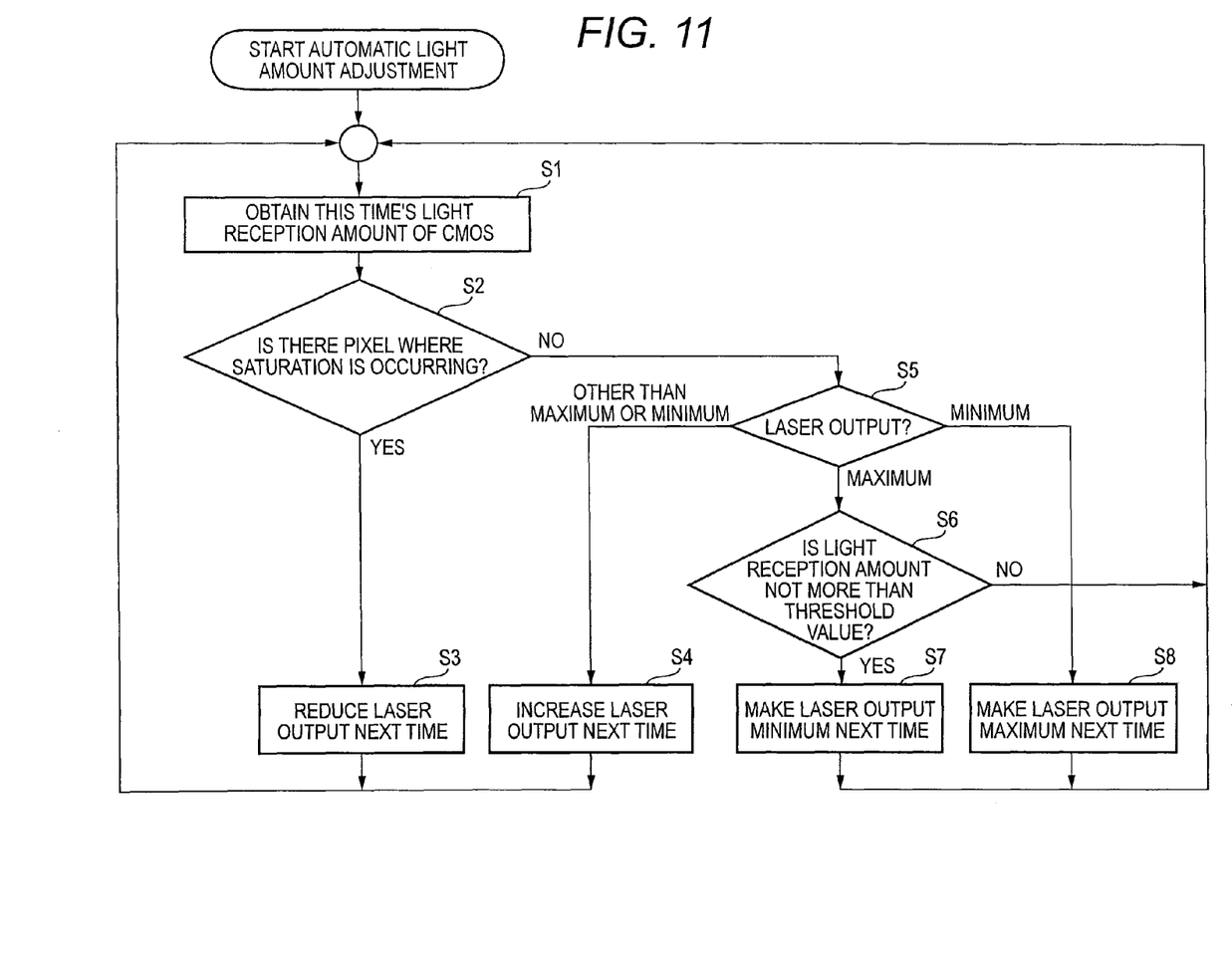
FIG. 11 is a flowchart showing the operation of the apparatus.

FIG. 11 shows a flowchart of this light amount control operation. FIG. 11, which is basically the same as FIG. 8, is different therefrom in the following: First, when no saturation is detected at step S2, the output of the laser light source 172 is checked (S5), and when the output of the laser light source 172 is maximum, it is further checked whether or not the amount of light reception by the CMOS image sensor 1732 is not more than a threshold value (S6). Here, a minimum light reception amount that can be measured may be set as the threshold value. When the amount of light reception by the CMOS image sensor 1732 is not more than the threshold value, the output of the laser light source 172 for the position in the next scanning is made minimum (S7), and when the amount is more than the threshold value, the output of the laser light source 172 is kept maximum. Thereby, the output of the laser light source when a non-detected part of the object 5 is measured can be made a minimum value, so that heat generation can be suppressed, power consumption can be reduced and the life of the light source can be extended.

When the output of the laser light source 172 is minimum at step S5, the output of the laser light source 172 for the position in the next scanning is made maximum (S8).

A reason therefor is as follows: As described above, in the three-dimensional measuring device 1, when a non-detected part of the object 5 is measured, the output of the laser light source 172 is made minimum. However, when the output of the laser light source 172 is always minimum, there is a possibility that light reception by the CMOS image sensor 1732 is not performed even though the detection of the object becomes possible. Therefore, by periodically checking the condition of the object surface, this problem can be solved.

While the output of the laser light source 172 for the non-detected part may be repetitively switched between the maximum value and the minimum value every scanning as described above, for example, the output may be switched to the maximum value when scanning is performed n times (n is a given integer) with the output of the laser light source 172 being kept minimum. Moreover, the laser output switching from the minimum value may be made to a value intermediate between the minimum value and the maximum value instead of to the maximum value.

Further, it may be performed to previously input CAD data or the like and set a measurement start position and a measurement end position thereby. In this case, the CAD data may be previously inputted to the host system 4 and stored into the program storage 1742 through the driving controller 2, or a setting prestored in the program storage 1742 may be called.

What is claimed is:

1. An image measuring apparatus comprising:
    a light source configured to emit linear light to an object to be measured;
    an imaging device configured to image the object; and
    a controller configured to adjust a light emission amount of the light source based on a light reception amount of the imaging device, wherein:
    the imaging device has a light receiving element arranged therein, and successively receives an image of the object in a direction of a row or in a direction of a column;
    when a light reception amount of the light receiving element is more than a maximum value, the controller reduces a light amount of the light source in next light reception;
    when the light reception amount of the light receiving element is less than the maximum value, the controller increases the light amount of the light source in the next light reception; and
    when the light amount of the light source reaches the maximum light amount and the light reception amount is smaller than a minimum value, the controller makes the light amount of the light source in the next light reception a minimum light amount.

2. The image measuring apparatus according to claim 1, wherein
    when the light amount of the light source is made the minimum light amount, the controller controls the light amount of the light source to the maximum light amount or a light amount between the maximum light amount and the minimum light amount in the next or n-th light reception (n is an integer that is more than one).

3. The image measuring apparatus according to claim 1, wherein
    the imaging device receives reflected light from the object in a direction at a predetermined angle with respect to a direction of light emission from the light source to the object.

4. The image measuring apparatus according to claim 1, wherein
    the imaging device has a CMOS element having a rolling shutter function of successively causing a light receiving element column arranged in a direction substantially orthogonal to the linear light from the light source to perform light reception scanning in a direction orthogonal to the light receiving element column.

5. An image measuring apparatus comprising:
    a light source that emits linear light to an object to be measured;
    an imaging device configured to image the object; and
    a controller configured to adjust a light emission amount of the light source based on a light reception amount of the imaging device, wherein:
    the imaging device has a light receiving element arranged therein, and successively receives an image of the object in a direction of a row or in a direction of a column;
    when a light reception amount of the light receiving element is more than a maximum value, the controller reduces a light amount of the light source in next light reception;
    when the light reception amount of the light receiving element is less than the maximum value, the controller increases the light amount of the light source in the next light reception; and
    when the light amount of the light source reaches the maximum light amount and the light reception amount is smaller than a minimum value, the controller alternately sets the light amount of the light source to a minimum light amount and to a light amount larger than the minimum light amount every light reception in next and succeeding light receptions.

* * * * *